2,379,230

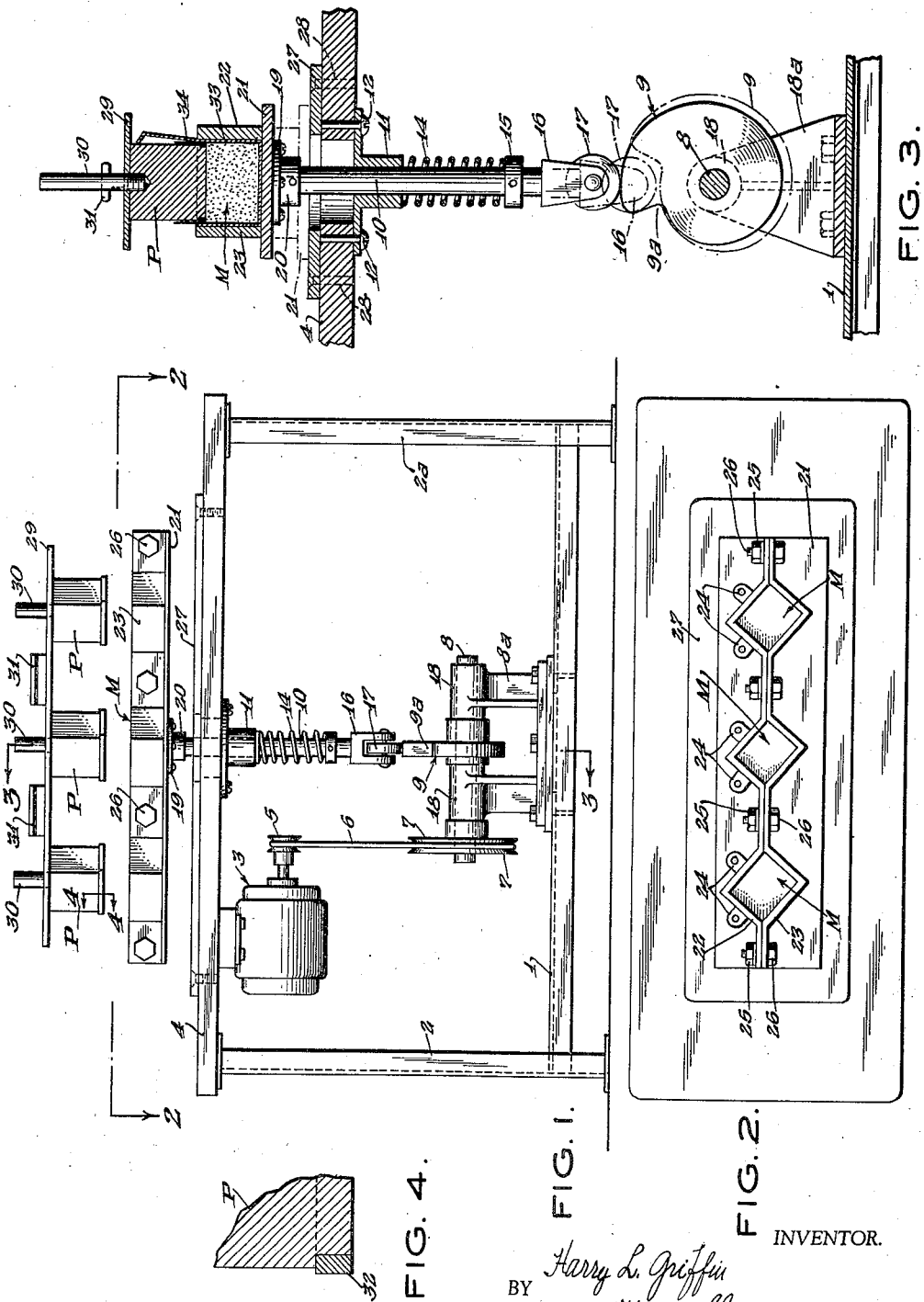
June 26, 1945.  H. L. GRIFFIN  2,379,230
METHOD FOR COMPACTING AND PACKAGING MILK POWDER AND
COMPACTED MASS OF MILK POWDER AND THE LIKE
Filed Dec. 12, 1940   2 Sheets-Sheet 1
INVENTOR.
Harry L. Griffin
BY Mock & Blum
ATTORNEYS June 26, 1945.  H. L. GRIFFIN  2,379,230
METHOD FOR COMPACTING AND PACKAGING MILK POWDER AND
COMPACTED MASS OF MILK POWDER AND THE LIKE
Filed Dec. 12, 1940  2 Sheets-Sheet 2
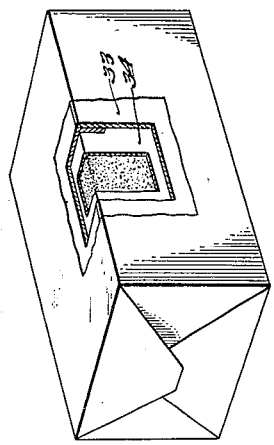
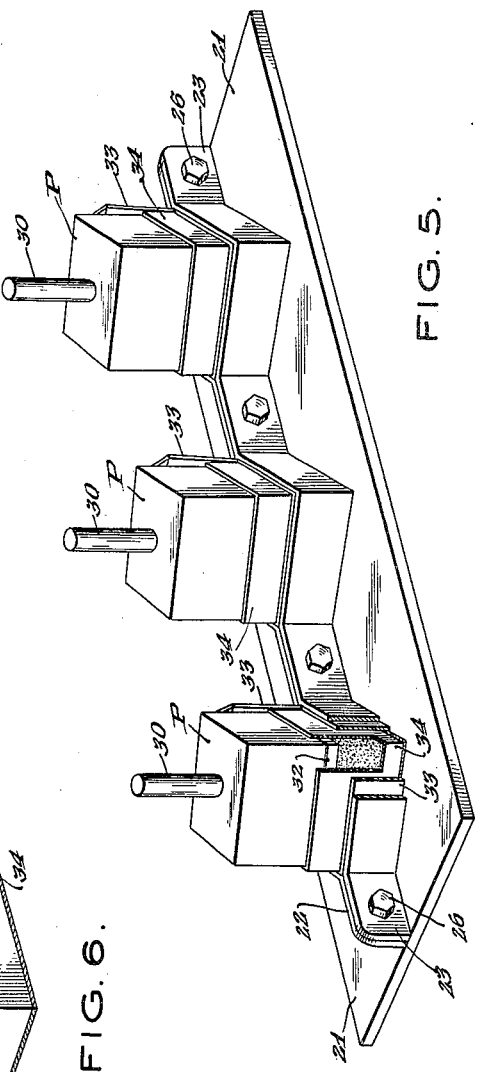
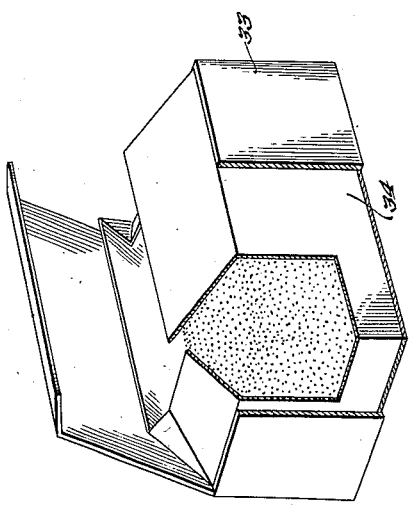
INVENTOR.
BY  *Harry L. Griffin*
    *Mocko Blum*
ATTORNEYS Patented June 26, 1945

UNITED STATES PATENT OFFICE 2,379,230

METHOD FOR COMPACTING AND PACKAGING MILK POWDER AND COMPACTED MASS OF MILK POWDER AND THE LIKE

Harry L. Griffin, Rockville Centre, N. Y., assignor to Nestle's Milk Products, Inc., New York, N. Y., a corporation of New York Application December 12, 1940, Srial No. 369,712

7 Claims. (Cl. 259—72)

My invention relates to a new and improved method of compacting and packaging milk powder and the like.

One of the objects of the invention is to provide a simple and efficient method whereby milk powder can be packaged, without the use of metal cans, thus greatly diminishing the cost of packaging this product.

Another object of the invention is to provide a method of packaging milk powder in the form of lightly compacted masses of predetermined shape, so that the compacted milk powder can be readily disintegrated and mixed with water by very simple and easy manipulation, without forming lumps, thus providing a liquid product which is substantially the same as fresh pasteurized milk.

Another object of the invention is to provide a method which can be carried out cheaply and automatically on a large scale.

Other objects of the invention will be stated in the annexed description and drawings, it being understood that the above general statement of the objects of the invention is intended generally to explain the same, and without limiting the invention in any manner.

Fig. 1 is a side elevation of the improved mechanism which can be used for carrying out the improved method.

Fig. 2 is a plan view on the line 2—2 of Fig. 1.

Fig. 3 is a sectional view, partially in elevation, on the line 3—3 of Fig. 1.

Fig. 4 is a sectional view on the line 4—4 of Fig. 1.

Fig. 5 is a perspective view of the mold units and their assembled plungers. In this view, the upper parts of the representations of the molds have been omitted.

Fig. 6 is a perspective view, partially broken away, showing the wrapping paper and the exterior carton in which the milk powder is placed, prior to compacting the milk powder. The mass of milk powder is shown as compacted in this view, and the sealing flaps of the liner are shown inwardly bent, and the cover of the carton is shown in inclined position.

Fig. 7 is a perspective view, partially broken away, showing the completely sealed package.

Heretofore milk powder, and more particularly whole milk powder, which contains the milk fat, has been extensively sold in sealed, air-tight metal cans. In order to prevent the milk powder from deteriorating, the air was evacuated from said cans, prior to the sealing thereof, or else the can was filled with an inert gas. However, metal cans are expensive, and in many cases, their cost is a major portion of the cost of the packed powder.

According to my invention, the milk powder is processed to form a lightly compacted block, which is substantially free from air and moisture, so that the milk powder remains stable, when said block is sealed in flexible paper which is impermeable to air and moisture. This block is of substantially uniform density and structure throughout. The particles of milk powder in said block are substantially the same in size and shape as in loose milk powder. This compacted block can be disintegrated and intermixed with water by using a spoon and stirring by hand, substantially as easily as loose milk powder. The resultant mixture is free from lumps, and it is substantially the same as a mixture of loose milk powder and water.

If a mass of milk powder is compacted by a positively operated plunger, the compacted mass is denser and more compressed at the top and bottom of the mass, than in the centre of the mass. Such a compacted mass forms lumps when it is stirred in constant with water, even if the plunger is slowly and carefully pressed against the loose milk powder, while said powder is located in a mold. Large scale production by the use of a mechanically operated plunger which is operated in a single stroke to compress the milk powder, is impractical. Likewise, when a plunger is applied under pressure in a single stroke, the air with which the milk powder is intermixed, is not effectively removed from the milk powder.

According to my invention, a mass of confined loose milk powder is subject to a series of light and rapidly succeeding intermittent compacting strokes or pulses.

The air is driven out of the mass during the compacting operations, and it is prevented or hindered from again entering between the particles, between the compacting operations. This is because the particles of milk powder are brought snugly against each other by the compacting operations. Other improvements will be later described herein.

Fig. 1 shows a machine which is provided with a base platform 1 and with standards 2, 2a. A motor 3 is suspended from the table 4 of the machine. This motor 3 may be an ordinary electric motor and it may be provided with any suitable speed-reduction drive. The shaft of the motor 3 is provided with a pulley 5, which is connected by a belt 6 to a larger pulley 7, which is mounted on a shaft 8. The shaft 8 is provided with a drop-cam 9. A vertical rod 10 is slidably guided in a suitable bearing 11, which is connected to the table 4 by means of fastening members 12. A compression spring 14 is mounted upon the rod or plunger 10. For this purpose the rod 10 is provided with a collar 15, which is rigidly connected to said rod 10. The lower end of the rod 10 is provided with a bearing 16, in which the usual cam-roll 17 is turnably mounted. The bearings 18 of the shaft 8 are connected to the base platform 1 by suitable fastening members. The plunger 10 is provided with a head 19, whose hub 20 is removably and rigidly secured to said plunger 10. The metal mold-support 21 is removably connected to the head 19 by suitable fastening members. One or more split molds are supported upon the top of the metal mold-plate 21.

In this embodiment I have illustrated the use of three metal molds Ma. Each mold Ma comprises a first metal mold member 22 and a companion metal mold member 23. The mold member 22 is provided with lugs 24 which are suitably fixed to the mold-support 21. Intermediate the molds Ma, said mold members 22 and 23 are provided with flanges, which are removably connected by fastening members 25 and 26. The end flanges of said members 22 and 23 are also removably connected by fastening members 25 and 26.

The full-line position of the cam 9 in Fig. 3 corresponds to the top position of the mold-support 21. The broken-line position of the cam 9 which is illustrated in Fig. 3 corresponds to the position in which the mold-support 21 abuts the metal jam-plate 27, which is connected to the table 4 by means of fastening members 28. When the plunger 10 is in its lowest position and when the metal mold-support 21 strikes against the metal jam-plate 27, there is a slight clearance between the cam-roll 17 and the adjacent part of the periphery of the cam 9.

Special compacting plungers P are used to facilitate the compacting of the milk powder uniformly within the molds, so that the lightly compacted block of milk powder can be readily disintegrated and intermixed with water, by stirring the powder into the water by hand, with an ordinary spoon. Each mold is associated with a plunger P. While the invention is not limited to the particular example given, it is illustrated specifically in connection with the production of a compacted block of milk powder which can be intermixed with a quart of water, in order to produce the substantial duplicate of a quart of pasteurized milk. In such case the length of the compacted block which is made according to my invention is about $3\frac{1}{18}$ inches, its width is about $2\frac{5}{32}$ inches, and its height is about 1.5 inches. The weight of the compacted block of milk powder is about 4.65 ounces. The dimensions and shape of the compacted block may be varied and the designation "block" includes a mass of cylindrical or any desired shape, such as frusto-conical, etc. However, I prefer to form a compacted block which has sharp edges and planar faces. Each of the plungers P is made of hard wood having a close grain. The weight of each plunger P is about ten ounces. These plungers P can be used either with or without a follower plate 29. This plate 29 has bores through which the pins 30 of the plungers P project snugly but slidably. The follower plate 29 is provided with handles 31. If the follower plate 29 is used, its weight will be about 37 ounces in this specific embodiment, in which said plate rests upon three plungers. This plate 29 is made of wood or metal or any other suitable material.

This follower plate rests upon the tops of the plungers, and it vibrates vertically up and down in unison with the plungers and the molds.

Fig. 4 shows that the bottom of each plunger P is undercut so as to provide an annular recess, in which the ring 32 is located. The member 32 is designated as a ring, although it is of rectangular shape in plan view, in this embodiment. This ring 32 is made of air-permeable and sanitary felt. The lateral dimension of the projecting part of the felt ring is about $\frac{1}{64}$ of an inch. The height of the recess which is thus formed at the bottom of the plunger P is about $\frac{1}{2}$ inch, and its width or lateral dimension is about $\frac{1}{16}$ of an inch. While this ring 32 permits air to pass through the same during the compacting strokes, its pores are so fine that the milk powder cannot pass through said ring 32.

The molds are vertically reciprocated in unison with their plungers 10 and in unison with the follower plate 29 (if this is used), and in unison with plungers P at the rate of about 100 complete reciprocations per minute. The height of this vertical reciprocation is about 3 inches.

In the preferred method of utilizing the machine, the body of carton 33 is located in each of the molds. This body has a laterally closed upstanding wall. The cover of the carton is maintained in the upward open position, as illustrated in Fig. 3. This carton 33 is made of light-impermeable cardboard or other suitable material, and when the cover of the carton 33 is sealed against the body of said carton, said sealed carton is light-tight. The liner 34 is then located in the body of the carton. This liner is made of flexible paper which is impermeable to air and to moisture. For this purpose the paper of the liner 34 may be impregnated or coated with wax or with any of the other well-known compositions which are used for this purpose. The flaps of the liner 34 can be sealed to each other, in order to form a moisture-proof and air-tight closure, by the use of heat and light pressure, in the ordinary heat-sealing machine. The closure flaps of this carton are vertically located during the compacting, as shown in Fig. 3. The required mass of milk powder is poured into each liner. In the example above given, the height of the mass of loose milk powder is about 1.7 inches to 1.8 inches, when the top surface of the loose milk powder is substantially horizontal. The horizontal top surface of the mass of loose milk powder is below the top edge of the mold. Each plunger P is then located in the liner of the respective mold, between the upstanding sealing flaps of the respective liner. The mold is of sufficient height to furnish a support for the plunger P, so that the plunger P will remain in upstanding position while the mold is reciprocated. The air-permeable member 32 of each plunger P fits snugly but slidably against the inner surface of the respective liner. If the follower plate 29 is used, this is located upon the tops of the three plungers, as illustrated in Fig. 1, so that the weight of the follower plate is equally distributed.

The machine is then operated so as to reciprocate the molds and the milk powder and the plungers P in unison. At the bottom of each reciprocating movement, the downward movement of the mold-plate 21 is abruptly stopped.

It is sufficient to thus treat the milk powder during a period of 2.5 seconds to 3.5 seconds, so that the milk powder is subjected to from 4–6 compacting operations. The weight of the plunger performs little or no function in compressing the particles of milk powder, because the downward momentum of the plunger, when the downward movement of the mold is abruptly stopped, is insufficient to substantially distort the particles of milk powder. The major function of the plunger is to prevent relative movement between the particles of milk powder, and the chamber in which said particles are enclosed. When the downward movement of the mold is abruptly stopped, the air which is between the milk particles will tend to throw the upper particles upwardly, and the function of the plunger is to keep the particles in snug contact, while the air is being expelled. The movement of the milk particles, independently of the plunger, causes said particles to work snugly toward the bottom of the mold, while the intermixed air is upwardly expelled. The plunger may have slight effect upon the the compacting of the milk powder, but this is not important. While the milk powder is thus subject to short compacting operations, the intermixed air is rapidly expelled through the member 32. During the upward movement of the molds, little or no air leaks through the member 32, to be again intermixed with the milk powder. Hence, after the mass of milk powder is thus treated, substantially all the intermixed air is removed. The lightly compacted block maintains its shape under its own weight, but it is indented or crumbles under very light finger pressure. The carton and liner and the block of compacted milk powder are then removed from the mold. The longitudinal flaps of the liner are then overlapped and sealed in the conventional heat-sealing machine, while the liner and the block are retained in the carton. This sealing is performed under light pressure, so as to expel the air between the overlapping sealed flaps and the top of the block of milk. The end flaps are then sealed to the longitudinal flaps, while the block and liner are still located in the carton, thus completely sealing the block in the liner. The liner and the enclosed block are then removed from the carton, and packed into a fresh carton, while the original carton is again used in the mold. This is preferable to packing the liner and its block in the original carton. The liner 34 is made of flexible paper, but it reinforces the lightly compacted block sufficiently, so that the wrapped block can be readily transferred from its original carton to another carton, without indenting or breaking the block.

The carton maintains the block in shape, during the sealing of the flaps of the liner under light pressure.

If the air in the mold were exhausted so as to maintain the mold under high vacuum during the compacting operation, substantially the same results could be secured.

The block which is thus made is sufficiently compacted to prevent air or moisture from substantially entering the same, so that the powder of the compacted block is stable for a long period of time, which is sufficient for commercial purposes. Air and moisture will leak through the best impermeable paper in time, but such air and moisture cannot penetrate the lightly compacted block of milk powder. The packaged product can be kept for three months to six months and even longer, without any substantial deterioration. The top of the block of milk powder is substantially flush with the top of the body of the carton 33, in order to prevent bulging. The height of the mass of loose milk powder may originally be from ⅛ of an inch to ¼ of an inch above the top edge of the body of the carton.

While the invention has been illustrated particularly with reference to powdered whole milk, it also includes the treatment of powdered skimmed milk, powdered milk foods of various types and other powdered food products which deteriorate under the action of air or moisture.

It is not necessary to insert a carton into the mold, and it is sufficient if a liner is inserted into the mold, in order to enclose the mass of milk powder, save at the top face thereof, during the compacting operation.

The volume of the compacted block is substantially 90% of the volume of an equal weight of loose milk powder. This loss of 10% in volume results substantially from bringing the particles of milk into closer relation while expelling the air, but without substantially distorting or compressing the particles themselves.

The invention is not limited to the particular mechanism or method disclosed herein, as it generally includes the production of a lightly compacted block of milk powder which has insufficient coherence per se to withstand the pressure which is required to seal the flaps of the flexible wrapper, so that the compacted block must be supported in a carton or other external support, in order to withstand the sealing pressure, with or without the use of heat. The sealing flaps of the flexible wrapper may be connected by an adhesive or connecting means other than an adhesive which requires the use of heat.

As shown in Fig. 3, when the roll 17 rides off the periphery of cam 9, the spring 14 rapidly moves the mold plate 21 downwardly into contact with the jam-plate 27. The mold is thus subjected to a sharp impact, and since the plunger P moves down in exact or substantial unison with the mold, the particles are brought closer to each other by this sharp impact, since the plunger prevents said impact from moving the particles upwardly. The air is compressed sufficiently during each impact, to escape through the air-permeable member 32. When the roll 17 rides off the raised part of the periphery of cam 9, said roll 17 and the mold-plate 21 are free to descend substantially immediately.

I claim:

1. A method of compacting a mass of milk powder, which consists in confining a charge of loose milk powder in predetermined shape in a flexible wrapper which encloses said charge save at a top free face of said charge, said charge being intermixed with air, holding said charge against upward movement relative to said wrapper by means of a plunger which contacts said free face, moving said mass of loose milk powder and said wrapper and said plunger in substantial unison in successive upward and downward movements, sharply stopping the downward movements of said charge and of said wrapper and of said plunger so as to urge said charge and said plunger downwardly relative to the wrapper with sufficient force to compress said air, removing the compressed air from said charge past said plunger during each said compression, checking the return flow of air past said plunger and into said charge during the upward movements of said charge and said wrapper and said plunger, the compacting force on said charge which is produced by said sharp stoppages of said downward movements being sufficient to produce a final compact block of sufficient coherence substantially to withstand its own weight, said compacting force being sufficiently light so that said block can be mixed into water without lumping by ordinary hand-stirring.

2. A method according to claim 1 in which the volume of said final block is substantially ninety per cent of the volume of said charge and air.

3. A method of expelling air from a mixture of loose milk powder and air, which consists in moving said mixture alternately in opposite directions while said mixture is wholly enclosed in a chamber which has an air outlet, said mixture and said chamber being thus moved in substantial unison, sharply stopping said movement at intervals so that the force which is produced by the inertia of said loose powder then subjects said air to pressure, expelling the air under said pressure out of said chamber, the air being thus expelled without any substantial expulsion of said powder, limiting the return flow of air into said chamber so that said movement of said mixture and said sharp stopping diminishes the amount of air which is intermixed with said powder.

4. A method according to claim 3 in which air is thus expelled until the volume of the powder which remains in said chamber is about 90% of the original volume of the mixture of milk powder and air.

5. A method according to claim 3 in which the force which is produced by said sharp stoppage in a plurality of such sharp stoppages is sufficient to compact the loose powder into a block which has sufficient coherence to stand up under its own weight, said force being insufficient substantially to distort the particles of milk powder, so that said block can be intermixed with water by ordinary hand-stirring, without lumping.

6. A method according to claim 3 in which air is thus expelled without substantially breaking down the particles of said milk powder.

7. A method according to claim 1 in which said exposed face is substantially planar, the cross-section of said charge is substantially identical in size and shape with the cross-section of said exposed face, and said charge has a straight axis which is substantially perpendicular to the plane of said exposed face.

HARRY L. GRIFFIN.